No. 709,874. Patented Sept. 30, 1902.
M. H. COHEN.
SPECTACLES.
(Application filed June 19, 1902.)
(No Model.)
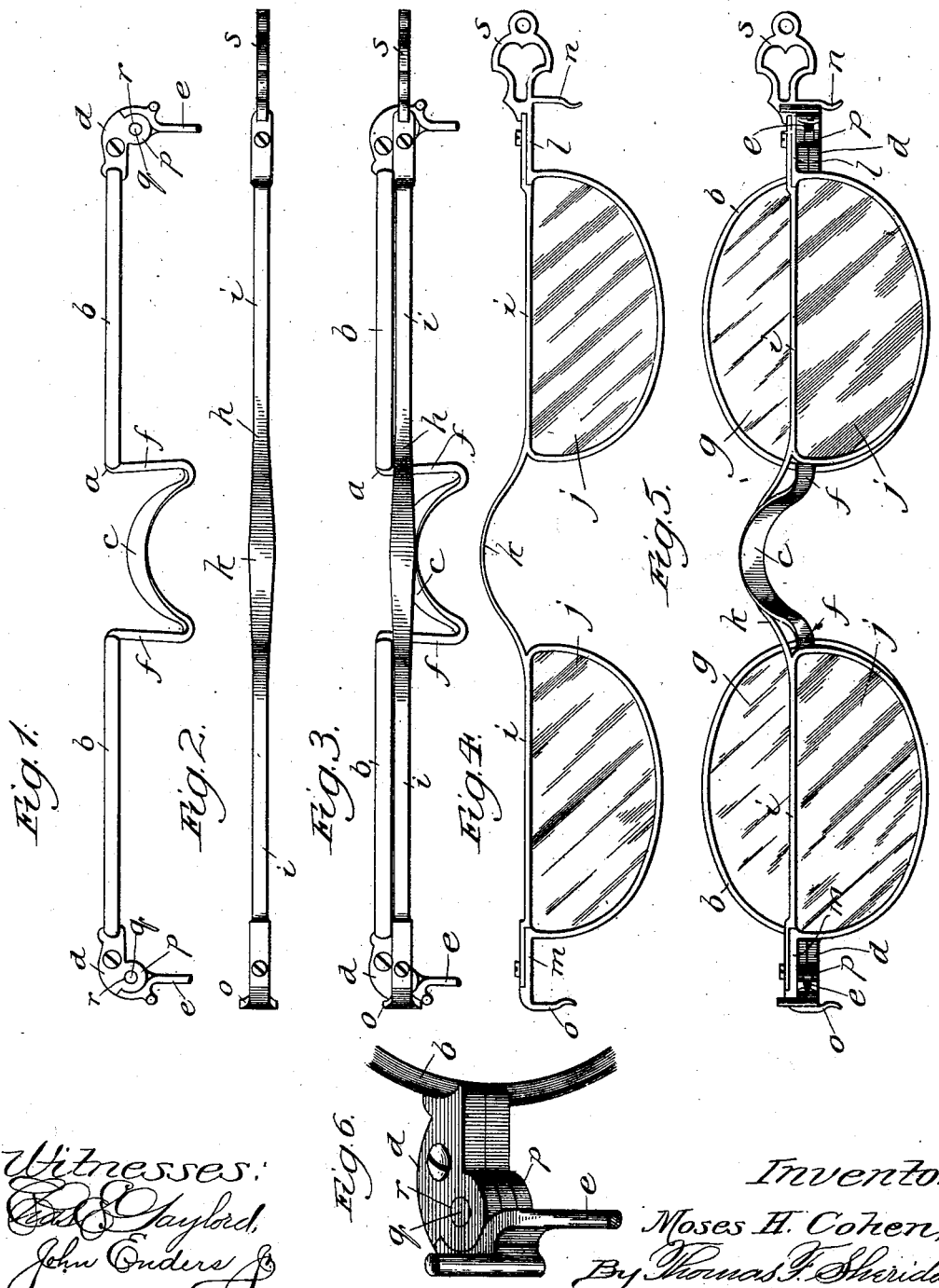
Witnesses:
Inventor:
Moses H. Cohen,
By Thomas F. Sheridan,
Att'y

UNITED STATES PATENT OFFICE.

MOSES H. COHEN, OF MARSEILLES, ILLINOIS.

SPECTACLES.

SPECIFICATION forming part of Letters Patent No. 709,874, dated September 30, 1902.

Application filed June 19, 1902. Serial No. 112,303. (No model.)

*To all whom it may concern:*

Be it known that I, MOSES H. COHEN, a citizen of the United States, residing at Marseilles, Lasalle county, Illinois, have invented certain new and useful Improvements in Spectacles, of which the following is a specification.

My invention relates to that class of spectacles which has a pair of main lenses connected by means of a nose-bridge and a pair of supplementary lenses removably mounted adjacent to and back of the main lenses and connected together by means of a bridge which extends over the nose-bridge of the main lenses, and particularly to that class of spectacles in which the main lenses are oval in conformation and fitted to the eyes of the wearer for viewing objects at a distance and the supplementary lenses semi-oval and removably mounted back of the main lenses and fitted for viewing objects near at hand when used in connection with the main lenses, whereby the wearer is enabled to readily place the supplementary lenses in position and remove them therefrom while the spectacles are in use and may readily employ one or both sets of lenses, as desired or as necessity may require.

The invention consists principally in a pair of main lenses which are preferably oval in conformation and connected together by means of a nose-bridge, which may be attached thereto in any ordinary and well-known manner, and a pair of supplementary lenses, preferably semi-oval in conformation, removably mounted back of the main lenses with their top edges preferably substantially straight and extending horizontally central of the oval lenses when in use.

The invention consists, further, in a pair of lenses mounted in a main frame consisting of a pair of rims and a nose-bridge connecting such rims, and thereby the lenses, the outer ends of the rims being provided with outwardly and rearwardly extending shoulders, in which the bows are pivotally mounted, and a supplementary frame consisting of a pair of rims connected together by means of a bridge adapted to extend over the nose-bridge of the main frame and having shoulders extending from the outer ends of such rims over the shoulders of the main frame and removably resting thereon, and a pair of lenses mounted in such supplementary frame.

The invention consists, further and finally, in the features, combinations, and details of construction hereinafter described and claimed.

In the accompanying drawings, Figure 1 is a view of the main frame looking at it from the top; Fig. 2, a view of the supplementary frame looking at it from the top; Fig. 3, a view of the main frame with the supplementary frame in operative position looking at them from the top; Fig. 4, a view in elevation of the supplementary frame and lenses; Fig. 5, a view in elevation of the main frame and supplementary frame looking at them from behind; and Fig. 6, a detail view of one of the shoulders of the main frame, showing the pivotal connection with the bow.

In constructing a pair of spectacles in accordance with my improvements I provide a main frame $a$, consisting of a pair of rims $b$, which are connected together by means of a nose-bridge $c$. The outer end of each rim may be provided with an outwardly and rearwardly extending shoulder $d$, in which the bows are pivotally mounted. The bridge $c$ consists of an upwardly-curved central portion connected with the rims, and thereby operatively with the lenses, by means of rearwardly-extending stem portions $f$, which are preferably integral with such curved central portion. These rearwardly-extending stem portions of the nose-bridge should be of sufficient length to admit of mounting a supplementary frame, hereinafter described, back of and substantially parallel with the main frame. A pair of lenses, which may be of any ordinary and well-known type and of suitable focal curvature to fit the eyes of the wearer and which may, if desired, be particularly adapted for use in viewing objects at a distance, is mounted in the main frame, such lenses and the rims of the main frame being in most instances preferably oval and accurately fitted together in the ordinary manner. I then provide a supplementary frame $h$, consisting of a pair of rims $i$, in which the lenses $j$ are mounted. These supplementary lenses are in most instances preferably semi-oval in contour, the upper edge being substantially straight and adapted to extend horizontally and centrally across the main oval lenses when in position and the lower edges being substantially of the same shape as those of the main lenses. By this arrangement when the supplementary lenses are in position back of the main or oval lenses the wearer will when looking downwardly see through the lower portion of the main lenses and also through the supplementary lenses, which cover the lower half of the main lenses, leaving the upper half exposed. It follows as a matter of course that when the eyes of the wearer are raised, as they would naturally be in looking at objects at a distance, he will see through the main lenses only. The main lenses are therefore made, as above mentioned, of such curvature as to be best suited to the purpose of observing objects at a distance, and the supplementary lenses are of such curvature as to fit the eyes of the wearer when used in combination with main lenses and for the purpose of observing objects near at hand—as, for instance, in reading.

In order to enable the supplementary lenses to be readily placed in position back of the main lenses, so that the lower half only of the main lenses will be covered thereby and the above desirable objects efficiently accomplished, the supplementary lenses are connected by means of a bridge $k$, which is of metal and adapted to extend over the stem portions of the nose-bridge and is curved, as shown, so as in no way to interfere with the functions of the nose-bridge, and such supplementary or semi-oval lenses are provided at their outer ends, substantially on a line with the upper edge thereof, with shoulders $l$ and $m$, extending outward longitudinally therefrom and which may be attached thereto by means of the rims or in any ordinary and well-known manner commonly employed in attaching lugs to lenses. These lugs may be provided with downwardly and inwardly extending hook portions $n$ and $o$, which serve to hold the supplementary lenses in position upon the main frames by removably and yieldingly engaging with the end lugs of the main frame. The natural spring of the connecting-bridge of the supplementary frame is ordinarily sufficient to produce the desired effect. The end lug $l$ is also provided with a handle $s$, by means of which the supplementary frame, with its lenses, may be readily placed in position and removed therefrom while the spectacles are in use.

The end lugs $d$ of the main frame are preferably provided with a rearwardly-projecting portion $p$, in which the bows are mounted by means of pivots $q$, extending through horizontal perforations $r$ in such lugs, and when the supplementary frame is placed in position back of the main lenses its shoulders rest upon the backwardly-extending shoulders of the main frame, and it is thus held removably in position.

I claim—

1. In spectacles of the class described, the combination of a pair of main lenses, a nose-bridge connecting such lenses, an outer shoulder for each lens attached thereto and extending outward and backward from the outer end thereof, a detached pair of supplementary lenses provided with a bridge extending over the nose-bridge and connecting such supplementary lenses, and a shoulder attached to the outer ends of such supplementary lenses and extending outward over the outer shoulders of the main lenses, substantially as described.

2. In spectacles of the class described, the combination of a pair of main lenses, a nose-bridge extending upward and backward from the inner ends of such lenses and in operative connection therewith, a shoulder attached to and extending outward and backward from the outer end of each lens, a detached pair of supplementary lenses removably mounted back of the main lenses, a bridge attached to the supplementary lenses connecting them and extending over the nose-bridge of the main lenses, and a shoulder attached to and extending outward from the outer end of each supplementary lens and having a downwardly and inwardly extending portion adapted to yieldingly engage the shoulder on the adjacent main lens, substantially as described.

3. In spectacles of the class described, the combination of a pair of oval lenses provided with a nose-bridge operatively connecting the inner ends thereof and extending backwardly and upwardly, a detached pair of semi-oval lenses removably mounted back of the main lenses having their top edge extending horizontally central of the main lenses, a bridge extending over the nose-bridge of the oval lenses and connecting the supplementary lenses, and means for yieldingly and removably connecting the supplementary lenses with the oval lenses, substantially as described.

4. In spectacles of the class described, the combination of a pair of main lenses, a pair of rims in which such lenses are mounted provided with a nose-bridge extending from and connecting the inner ends of such rims and thereby the lenses and forming a main frame, a shoulder on the outer end of each rim extending outwardly and backwardly therefrom, a bow pivotally mounted in each of the shoulders, a supplementary frame consisting of a pair of rims and a connecting-bridge removably mounted back of the main lenses, a detached pair of supplementary lenses in such frame, a connecting-bridge in the supplementary frame extending over the nose-bridge of the main lenses and connecting the rims of the supplementary frame and thereby the supplementary lenses, and a shoulder upon the outer end of each rim of the supplementary frame extending outward over the shoulders of the main frame and resting removably thereon, substantially as described.

5. In spectacles of the class described, the combination of a main frame consisting of a pair of rims and a nose-bridge connecting the inner ends of such rims, a shoulder extending outwardly and backwardly from the outer end of each rim, a bow pivotally mounted in each shoulder, a pair of oval lenses mounted in such main frame, a supplementary frame removably mounted back of the main frame having shoulders extending outward from the outer ends thereof over and resting removably upon the shoulders of the main frame, and a pair of substantially semi-oval lenses mounted in such supplementary frame and having their top edges extending horizontally centrally of the oval lenses, substantially as described.

6. In spectacles of the class described, the combination of a main frame having a nose-bridge extending backward and upward therefrom and provided with end shoulders extending outward and backward from the outer ends thereof, a pair of lenses mounted in such main frame, a detached supplementary frame consisting of a pair of rims having a connecting-bridge adapted to extend over the nose-bridge of the main frame, a pair of shoulders extending outward longitudinally of the supplementary frame over the shoulders of the main frame, each having a downwardly-extending hook portion for engaging a shoulder of the main frame, and a pair of semi-oval lenses mounted in the supplementary frame, substantially as described.

MOSES H. COHEN.

Witnesses:
HARRY I. CROMER,
ANNIE C. COURTENAY.